(12) United States Patent
Laurent et al.

(10) Patent No.: US 6,182,012 B1
(45) Date of Patent: Jan. 30, 2001

(54) METHOD AND DEVICE INTENDED FOR PERMANENT MONITORING OF AN UNDERGROUND FORMATION

(75) Inventors: Jean Laurent, Orgeval; Frédéric Huguet, Epinay, both of (FR)

(73) Assignees: Institut Francais du Petrole, Rueil-Malmaison Cedex (FR); Gaz de France Service National, Paris (FR)

( * ) Notice: Under 35 U.S.C. 154(b), the term of this patent shall be extended for 0 days.

(21) Appl. No.: 09/253,535

(22) Filed: Feb. 22, 1999

(30) Foreign Application Priority Data

Feb. 20, 1998 (FR) .................................................. 98 02170

(51) Int. Cl.⁷ ...................................................... G01V 1/46
(52) U.S. Cl. ................................................................ 702/6
(58) Field of Search ................................... 702/6, 12, 13, 702/14; 367/57, 58

(56) References Cited

U.S. PATENT DOCUMENTS

| | | | |
|---|---|---|---|
| 2,087,702 | * 7/1937 | Peters | 367/58 |
| 2,908,889 | * 10/1959 | Piety | 702/14 |
| 3,693,717 | * 9/1972 | Wuenschel | 166/285 |
| 5,171,943 | 12/1992 | Balogh et al. | 181/102 |
| 5,461,594 | 10/1995 | Mougenot et al. | 181/102 |
| 5,481,502 | 1/1996 | Cretin et al. | 367/77 |

FOREIGN PATENT DOCUMENTS

| | | | |
|---|---|---|---|
| 697036 | 10/1940 | (DE) . | |
| 2688896 | 9/1993 | (FR) | G01V/3/34 |
| 2728973 | 7/1996 | (FR) | G01V/1/02 |

* cited by examiner

*Primary Examiner*—Donald E. McElheny, Jr.
(74) *Attorney, Agent, or Firm*—Antonelli, Terry Stout & Kraus, LLP

(57) ABSTRACT

The invention is a method and device for permanent seismic monitoring of an underground formation by means of one or more seismic emission-reception sets comprising a source (S) such as a vibrator and elastic wave receivers (R1, R2, ..., Rn) such as geophones and/or hydrophones. A well (W) is drilled into the ground. Seismic receivers (R1 to Rn) are lowered therein and coupled with the surrounding formation. The section of the well is widened in the upper part thereof so as to form a cavity (P) against whose walls the seismic source (S) is pressed. Receivers (R) and source (S) are connected to an outside signal control and acquisition station (ST). The wells (W) can be exploration wells that are drilled for example around wells intended for production of reservoirs containing fluids, or mixed exploration and production wells. Each source can also be coupled with a cavity next to the well. The operations intended for setting of these equipments are relatively simple and the site coverage area of the various wells is reduced, which facilitates their integration in reservoir production sites. The method and device can be applied for monitoring of oil-bearing reservoirs or of gas storage reservoirs.

24 Claims, 1 Drawing Sheet

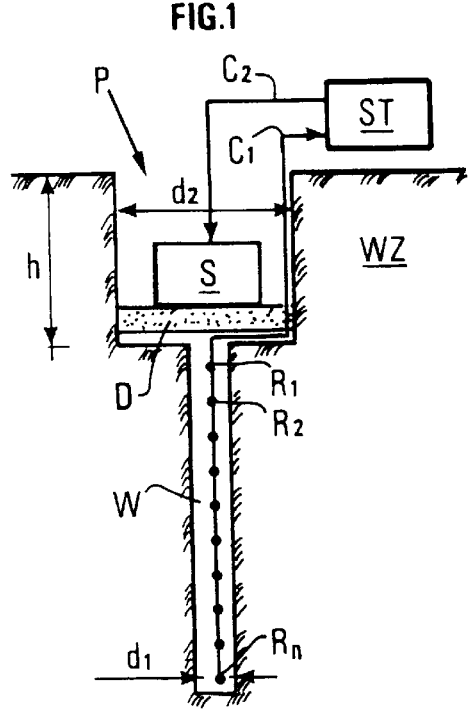
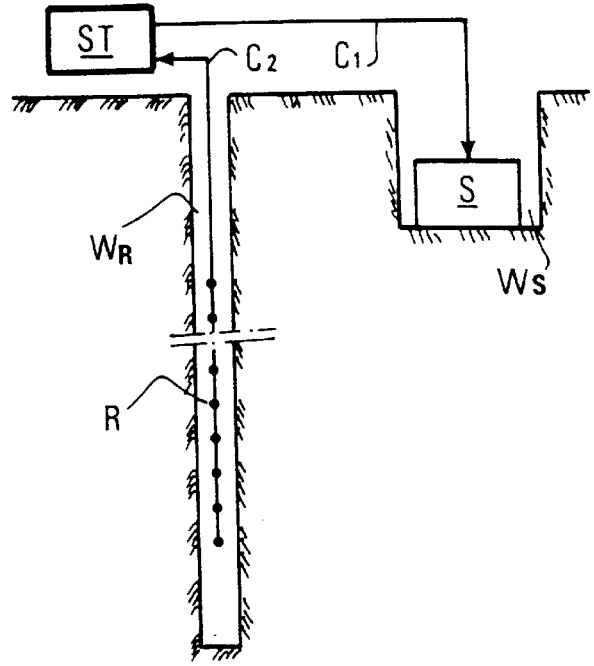
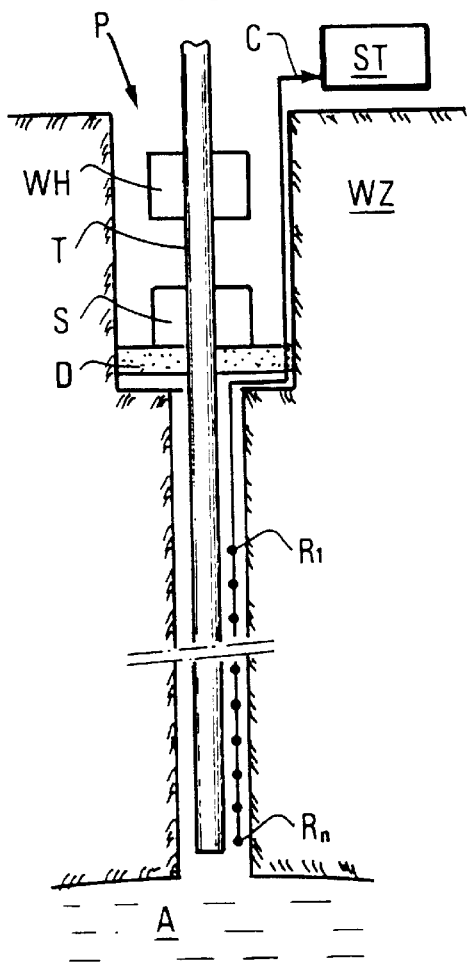
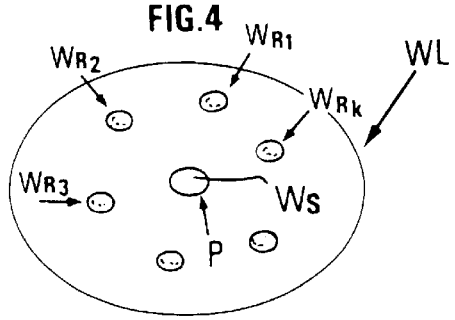
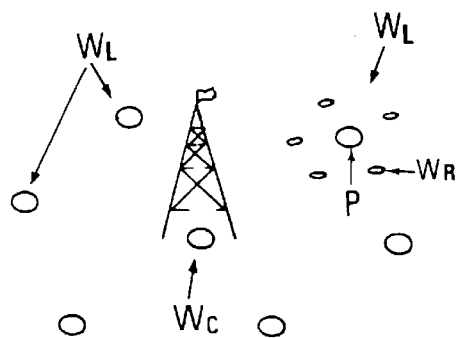

METHOD AND DEVICE INTENDED FOR PERMANENT MONITORING OF AN UNDERGROUND FORMATION

BACKGROUND OF THE INVENTION

1. Field of the invention

The present invention relates to a method and to a device intended for permanent seismic monitoring of an underground zone.

2. Description of the Prior Art

It is for example well-known to test the filling of an underground reservoir intended for natural gas storage at successive times, by means of a seismic system comprising a vibrator or an impulsive source for applying impact pulses to the ground surface and a reception device comprising alignments of elastic wave pickups positioned at the surface or in a well and coupled with the ground. As gas injection significantly alters the sound velocity, the density and therefore the reservoir formation, it is possible to determine the variation of the time interval on the seismic records between two reflectors, one being positioned above, the other below the reservoir. Filling evolution can also be followed by measuring the amplitude variation of the waves reflected near to the layers of the reservoir, at successive filling times.

U.S. Pat. Nos. 4,775,009, 4,986,350, 5,181,565 and 5,481,501 and notably, French Patent 2,688,896, describe systems comprising one or more service sets installed permanently in wells connected to the surface by means of one or more transmission channels. These service sets can be seismic receivers and possibly one or more seismic wave sources set in wells. The receivers or emitters can be placed outside casing pipes and coupled with the surrounding formations by the cement injected in the annulus around these pipes once set. The arrays of receivers can also be associated with a tubing lowered in a well and coupled with the formations surrounding the well if they are pressed against the wall of the well directly or by means of a casing pipe for example.

French Patents 2,703,457 and 2,703,470 and U.S. Pat. No. 5,243,562 describe seismic monitoring methods for underground reservoirs using arrays of receivers placed in wells or of seismic sources placed at the surface or possibly in these wells.

Seismic subsurface exploration is generally performed by coupling with the ground seismic sources or receivers according to various combinations where the sources and/or the receivers are positioned at the surface or in the neighborhood thereof, or in one or more wells through the explored formation.

A series of seismic emission-reception cycles are carried out by changing each time the location of the seismic source in relation to the axis of the well where the arrays of receivers are installed, according to a technique known as <<walk-away>>, and by recording the arrivals at receivers R1 to Rn as a function of the propagation time t.

Monitoring of oil-bearing reservoirs or of gas storage reservoirs generally implies long-lasting operations because the variations to be observed are relatively slow.

U.S. Pat. No. 5,724,311 of the Assignee describes a permanent monitoring system that obtains a perfect reproducibility of the operating conditions in repetitive seismic monitoring operations in an underground zone crossed by at least one well or borehole, and notably an underground gas storage reservoir. This system comprises one or more arrays of seismic receivers (buried, at the surface or placed in one or more wells), several repetitive seismic sources (buried or at the surface), all permanently installed, and a permanent link network for selective power supply to these sources. A central station selectively remote-controls each of these sources and records the seismic signals coming from the underground zone in response to the seismic waves transmitted selectively in the ground by the sources.

This array of permanently installed sources, whose coupling with the surrounding formations remains stable, and this at least partly buried supply network, whose surface coverage area is reduced, allow to carry out a whole series of long-lasting seismic monitoring operations under stable operating conditions without risks of incompatibility with the activities of the production site.

SUMMARY OF THE INVENTION

The device according to the invention is suitable for various applications. It can notably be used for long-term seismic monitoring of an underground zone containing fluids: oil production zones, underground gas storage reservoirs, etc., and follow-up of the evolution thereof with time.

The method of permanent monitoring of an underground formation according to the invention simplifies further operations of permanent installation of at least one seismic emission-reception set comprising a seismic source and seismic receivers, while reducing the site coverage area thereof so as to not interfere with production.

The method comprises forming at least one well for a series of seismic receivers that are permanently coupled in the at least one well with the surrounding formation, and carrying out emission-reception cycles with emission of seismic waves in the formation and acquisition of the signals picked up by the seismic receivers, in response to the seismic waves reflected by the formation. The emission-reception cycles are carried out with at least one repetitive seismic source that is permanently coupled with the bottom of a cavity, each source being associated with at least one series of seismic receivers in a well in the immediate vicinity of the cavity.

Each cavity can be formed by widening of the section of a well in the upper part thereof, over a certain height. Several wells drilled for seismic receivers can be associated with a single cavity.

The method can be used within the scope of the development of an underground reservoir, with a series of seismic receivers coupled with the formation and a source positioned at the bottom of a cavity, in the vicinity of the wellhead or at the bottom of at least one other cavity associated with at least one other well.

The receivers are for example associated with a fluid transfer pipe lowered in the well, in order to connect an underground zone with a surface production equipment, and coupled with the formation surrounding the well.

The cavities are preferably deep enough for the source to be coupled with the formation below the weathered zone.

When a cavity is formed in the upper part of a well intended for receivers, the method can comprise interposing, if need be, a tube wave attenuator between the source and the cavity bottom.

Such wells and cavities can be drilled at the bottom of a water body for permanent installation of one or more seismic monitoring sets.

The permanent seismic monitoring device according to the invention comprises at least one array of seismic receivers (geophones and/or hydrophones) suited to be lowered in at least one well and coupled with the formation surrounding the well, at least one seismic source suited to be pressed against the bottom of a cavity close to the well, a control and recording station, and a connection of each array of seismic receivers and each seismic source to a control and recording station for signal transmission.

The device can comprise for example one or more vibrators, at least one array of seismic receivers positioned at intervals along a rigid pipe lowered in at least one well, associated with mobile coupler which couples the receivers with the formations surrounding the well and for decoupling them mechanically from each pipe, or associated with a casing pipe of at least one well. It can also comprise a tube wave dampener means associated with at least one source.

The device according to the invention is very advantageous because each seismic emission-reception set is permanently installed in a single well (or in two neighboring wells) whose site coverage area is relatively limited. Drilling of these wells, distinct or in two parts, can be readily achieved with conventional drilling or excavating equipments. The device can therefore be readily integrated in reservoir development or fluid storage sites. The sources are pressed against the bottom or the walls of cavities preferably deep enough to reach the formations below the weathered zone, their coupling with the formation is thus improved.

BRIEF DESCRIPTION OF THE DRAWINGS

Other features and advantages of the method and of the device according to the invention will be clear from reading the description hereafter of a non limitative example, with reference to the accompanying drawings wherein:

FIG. 1 diagrammatically shows a seismic emission-reception set placed in a single well, FIG. 2 diagrammatically shows a seismic emission-reception set placed in a well equipped for development of a reservoir, FIG. 3 diagrammatically shows a seismic emission-reception set in two neighboring wells, FIG. 4 diagrammatically shows a layout of seismic emission-reception sets comprising a central well for a source and one or more peripheral wells for seismic receivers, and FIG. 5 shows a possible well layout for seismic emission-reception sets distributed on a reservoir production site.

DETAILED DESCRIPTION OF THE INVENTION

According to the embodiment of FIG. 1, the device comprises at least one seismic emission-reception set including a seismic source S and a series of seismic receivers R1, R2, . . . , Rn, placed below the ground surface. A well W is first drilled with a large diameter d1 according to whether it is intended for pure exploration operations or for monitoring production of a reservoir containing fluids.

The upper part of well 1 thus drilled is thereafter widened so as to form a cavity P of dimension d2 sufficient to house at least one source S, and of a certain depth h.

Source S is coupled with the bottom and/or the walls of cavity P, either directly or by means of a layer D of a material absorbing elastic waves, intended to prevent direct propagation of the parasitic waves known as tube waves to receivers R.

The source can be a gas gun type impulsive source for example, or a vibrator of a well-known type. It can be an eccentric-flywheel vibrator, an electro-hydraulic or electro-acoustic vibrator, a piezoelectric or magnetostrictive type vibrator, similar to those described for example in U.S. Pat. Nos. 5,135,072 and 667,518. Several vibrators can be pressed against the walls of each cavity and actuated in parallel.

One preferably digs deep enough (h is generally of the order of a few meters to a few tens of meters) for the bottom of cavity P to be below the surface zone referred to as the weathered zone (WZ), so as to avoid known parasitic events linked to the instability of this zone.

The array of seismic receivers R1 to Rn is placed in well W and coupled with the formation surrounding the well. These receivers can be geophones, preferably multi-axis ones (triphones for example) and/or hydrophones placed at a distance from one another along the hole.

The device comprises a station ST intended for control of the source and acquisition of the signals produced by receivers R in response to the seismic waves received. Station ST is connected to source S by means of a multi-conductor cable C1 and to receivers R1–Rn by a cable C2.

Coupling of the geophones with the formation can be achieved by embedding them in cement that is poured in the well after setting them. When at least part of the receivers also comprise hydrophones coupled with the formations surrounding the well by immersion in fluid, coupling device of a well-known type, with flexible plates for example, as described notably in U.S. Pat. No. 2,943,694, are associated with the geophones.

According to a layout already described in U.S. Pat. No. 4,775,009 French Patents 2,703,457 and 2,276,723 mentioned above, the geophones can be placed behind a casing pipe of the well and coupled with the formation by the cement used for sealing the casing after setting it.

Receivers R1–Rn can also be placed at a distance from one another along a rigid pipe such as a tubing and associated with means which presses them against the wall of well W, while decoupling them acoustically from the pipe.

In applications where the device is intended for seismic monitoring of a well used for production of an underground reservoir containing fluids, whether a fluid producing reservoir or a gas storage reservoir for example, the receivers are placed (FIG.2) along a fluid transfer tubing T connecting the underground zone under development to a surface production equipment (not shown), this tubing ending in a wellhead WH. The selective coupling modes already described in U.S. Pat. Nos. 5,181,565 and 2,674,029 (U.S. Pat. No. 5,243,562) can be used. In this type of application, source S is placed in the cavity beside or around tubing T as illustrated in FIG. 2.

According to the embodiment of FIG. 3, the receivers and the source of elastic waves can also be placed in two distinct wells $W_R$ and $W_s$.

A single well $W_s$ for a seismic source is preferably associated with k wells (k $\geq$2) $W_{R1}$, $W_{R2}$, . . . , $W_{Rk}$ for seismic receivers distributed (FIG.4) around the well for the source. Several arrays comprising a source and receivers with the pattern $W_L$ shown in FIG. 3 or 4 can thus be distributed in the field.

According to the embodiment of FIG. 5, it is possible to distribute a plurality of emission-reception sets as shown in FIG.1 or 2 in wells on a reservoir production site, around a central well $W_c$ communicating with the reservoir and intended for fluid transfer.

In the production well, the emission-reception set is of the type shown in FIG.2. For the emission-reception sets in the peripheral wells (pattern $W_L$), the layouts shown in FIGS. 1, 3 or 4 are used.

With several emission-reception sets being thus installed in an observation zone, crossed seismic acquisitions can be carried out with triggering of any seismic source and reception-acquisition of the waves coming from the formation in response to the waves emitted.

The wells intended to house these emission-reception sets can be readily bored with conventional drilling or excavating equipments. Wells W a few hundred meters in depth and of the order of 17 cm (7") in diameter can for example be drilled, and cavities P about 50 cm (20") in diameter. The site coverage area of these buried emission_reception sets is limited and their monitoring activity is therefore entirely compatible with production operations.

Such emission-reception sets can of course also be buried in wells drilled at the bottom of a water body, in a zone around an offshore production site.

What is claimed is:

1. A method of permanent seismic monitoring of an underground reservoir, comprising:

drilling at least one well;

permanently positioning a series of seismic receivers in the at least one well and coupling the seismic receivers with formations surrounding the at least one well;

forming a cavity by widening an upper part of a section of the at least one well;

permanently coupling a repetitive seismic source with a bottom of the cavity; and achieving emission-reception cycles with emission of seismic waves in the formations and acquisition of seismic signals sensed by the seismic receivers, in response to the seismic waves reflected by the formation.

2. A method as claimed in claim 1, wherein:

the seismic receivers are positioned in at least one production well having production equipment and a wellhead.

3. A method as claimed in claim 1, wherein:

the repetitive seismic source is coupled with the bottom of the cavity through a tube wave attenuator.

4. A method as claimed in claim 2, wherein:

the repetitive seismic source is coupled with the bottom of the corresponding cavity through a tube wave attenuator.

5. A method as claimed in claim 1, wherein:

a depth of the cavity is sufficient to couple the repetitive seismic source with the formations below a weathered zone.

6. A method as claimed in claim 2, wherein:

a depth of the cavity is sufficient to couple the repetitive seismic source with the formations below a weathered zone.

7. A method as claimed in claim 1, wherein:

the at least one well is drilled at a bottom of a water body.

8. A method as claimed in claim 2, wherein:

the at least one well is drilled at a bottom of a water body.

9. A method of permanent seismic monitoring of an underground reservoir, comprising:

forming at least one assembly including a cavity formed in the ground;

permanently coupling a repetitive seismic source with a bottom of the cavity;

drilling wells around the cavity;

permanently positioning a series of seismic receivers in each of the wells and coupling the seismic receivers with formations surrounding the wells; and achieving emission-reception cycles with emission of seismic waves by the repetitive seismic source in the formations and acquisition of signals sensed by the seismic receivers of each cycle, in response to the seismic waves reflected by the formations.

10. A method as claimed in claim 9, wherein:

the at least one assembly is associated with a production well drilled in the formations in which a series of seismic receivers are lowered and coupled with the formations.

11. A method as claimed in claim 9, wherein:

a depth of the cavity is sufficient to couple the repetitive seismic source with the formations below a weathered zone of the formations.

12. A method as claimed in claim 10, wherein:

a depth of the cavity is sufficient to couple the repetitive seismic source with the formations below a weathered zone of the formations.

13. A method as claimed in claim 9, further comprising:

using a repetitive seismic source coupled with the bottom of the cavity through a tube wave attenuator.

14. A method as claimed in claim 10, further comprising:

using a repetitive seismic source coupled with the bottom of the cavity through a tube wave attenuator.

15. A method as claimed in claim 9, wherein:

the at least one assembly is located at a bottom of a water body.

16. A method as claimed in claim 10, wherein:

the at least one assembly is located at a bottom of a water body.

17. A device for permanent seismic monitoring of a formation, comprising:

at least one array of seismic receivers for lowering into at least one well and coupling with formations surrounding the well;

a repetitive seismic source for coupling with a bottom of a cavity formed by widening an upper part of a section of each well;

a control and recording station which controls the repetitive seismic source and acquires seismic signals sensed by the at least one array of seismic receivers; and a connection which connects each array of seismic receivers and the seismic source to the control and recording station.

18. A device as claimed in claim 17, comprising:

a layer of damping material which absorbs elastic waves, interposed between the seismic source and the bottom of the cavity.

19. A device as claimed in claim 17 wherein:

the repetitive seismic source comprises at least one vibrator.

20. A device as claimed in claim 18 wherein:

the repetitive seismic source comprises at least one vibrator.

21. A device as claimed in claim 17, wherein:

the at least one array of seismic receivers is placed at intervals along a rigid tubing lowered in at least one well, associated with a mobile coupling device which couples the at least one array of seismic receivers with the formations surrounding the at least one well and which decouples the at least one array of seismic receivers mechanically from the rigid tubing.

22. A device as claimed in claim 18, wherein:

the at least one array of seismic receivers is placed at intervals along a rigid tubing lowered in at least one well, associated with a mobile coupling device which couples the at least one array of seismic receivers with the formations surrounding the at least one well and which decouples the at least one array of seismic receivers mechanically from the rigid tubing.

23. A device as claimed in claim 17, comprising:

at least one array of seismic receivers is associated with a casing pipe of the at least one well.

24. A device as claimed in claim 18, comprising:

at least one array of seismic receivers is associated with a casing pipe of the at least one well.

* * * * *